(12) United States Patent
Pard

(10) Patent No.: US 9,346,500 B2
(45) Date of Patent: *May 24, 2016

(54) TRACK AND DRIVE SPROCKETS FOR A TRACKED VEHICLE

(71) Applicant: BOMBARDIER RECREATIONAL PRODUCTS INC., Valcourt (CA)

(72) Inventor: Jean-Sebastien Pard, Tingwick (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 36 days.

This patent is subject to a terminal disclaimer.

(21) Appl. No.: 14/221,699

(22) Filed: Mar. 21, 2014

(65) Prior Publication Data

US 2014/0203627 A1    Jul. 24, 2014

Related U.S. Application Data

(63) Continuation of application No. 13/017,787, filed on Jan. 31, 2011, now Pat. No. 8,708,432.

(51) Int. Cl.
| | |
|---|---|
| *B62D 55/12* | (2006.01) |
| *B62D 55/125* | (2006.01) |
| *B62D 55/24* | (2006.01) |
| *B62D 55/26* | (2006.01) |

(52) U.S. Cl.
CPC .............. *B62D 55/12* (2013.01); *B62D 55/125* (2013.01); *B62D 55/24* (2013.01); *B62D 55/26* (2013.01); *B62D 55/244* (2013.01)

(58) Field of Classification Search
CPC ........ B62D 55/12; B62D 55/24; B62D 55/26; B62D 55/125; B62D 55/244
USPC ......... 305/165, 168, 173, 174, 175, 178, 193, 305/195, 199
See application file for complete search history.

(56) References Cited

U.S. PATENT DOCUMENTS

| | | | | |
|---|---|---|---|---|
| 3,575,474 | A * | 4/1971 | Russ, Sr. ................. | 305/165 |
| 3,756,668 | A * | 9/1973 | Russ, Sr. ................. | 305/179 |
| 3,930,689 | A * | 1/1976 | Maki ....................... | 305/180 |
| 4,217,006 | A * | 8/1980 | Dehnert .................. | 305/168 |
| 5,484,321 | A * | 1/1996 | Ishimoto ................. | 446/433 |
| 5,709,440 | A * | 1/1998 | Lecours .................. | 305/178 |
| 6,176,557 | B1 * | 1/2001 | Ono ........................ | 305/177 |
| 6,322,172 | B2 * | 11/2001 | Lussier ................... | 305/160 |
| 6,510,913 | B1 | 1/2003 | Morin et al. | |
| 6,733,091 | B2 | 5/2004 | Deland et al. | |
| 6,976,742 | B2 * | 12/2005 | Girard et al. ............ | 305/199 |
| 7,425,044 | B2 * | 9/2008 | Soucy et al. ............ | 305/178 |
| 7,597,167 | B2 | 10/2009 | Kubota | |

(Continued)

*Primary Examiner* — S. Joseph Morano
*Assistant Examiner* — Jean Charleston
(74) *Attorney, Agent, or Firm* — BCF LLP

(57) ABSTRACT

A sprocket wheel and drive track assembly of a tracked vehicle includes at least one drive sprocket having a sprocket wheel. A plurality of internal teeth extending laterally therefrom is distributed in a circumferential direction on a periphery thereof at a sprocket pitch from each other. A belt in contact with the at least one drive sprocket has an inner side, an outer side, a longitudinal and a lateral direction. At least two of a plurality of internal lugs distributed on the inner side thereof are engaged by at least two of the plurality of internal teeth of the at least one drive sprocket. The plurality of internal lugs is disposed to form at least one longitudinal row. At least two consecutive internal lugs are disposed at a first pitch from each other. The first pitch is longer than an arc length corresponding to the sprocket pitch.

20 Claims, 16 Drawing Sheets

(56) References Cited

U.S. PATENT DOCUMENTS

| | | | |
|---|---|---|---|
| 2006/0012247 A1* | 1/2006 | Girard et al. | 305/199 |
| 2008/0174176 A1* | 7/2008 | Berg | 305/193 |
| 2009/0085398 A1* | 4/2009 | Maltais | 305/178 |
| 2012/0161511 A1 | 6/2012 | Brazier | |

* cited by examiner

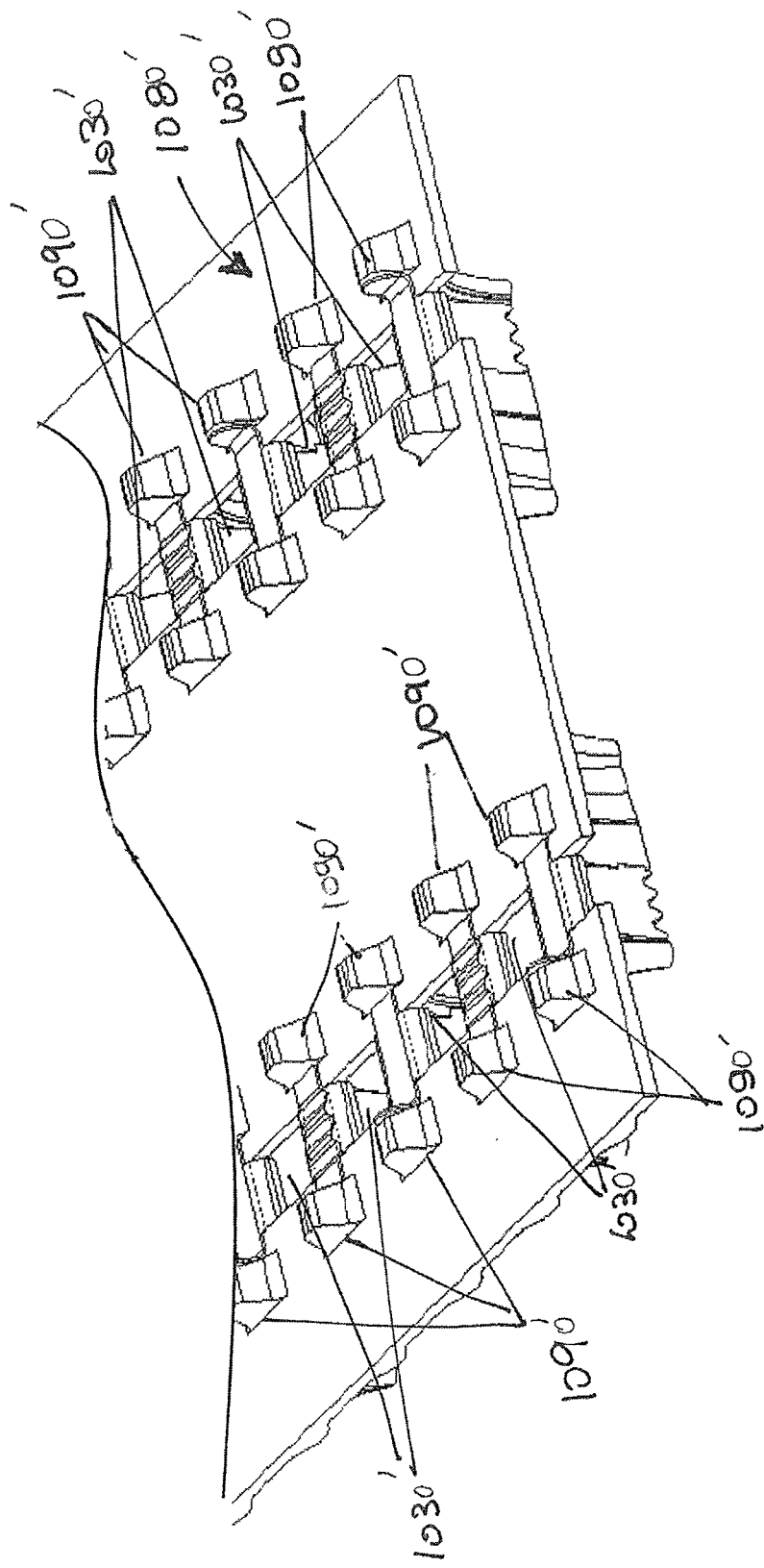

TRACK AND DRIVE SPROCKETS FOR A TRACKED VEHICLE

CROSS-REFERENCE

The present application is a continuation of U.S. patent application Ser. No. 13/017,787, filed on Jan. 31, 2011, the entirety of which is incorporated herein by reference.

TECHNICAL FIELD

The present invention generally relates to tracks and drive sprockets for tracked vehicles.

BACKGROUND

Tracked vehicles such as snowmobiles and snow groomers drivingly engage the ground through one or more endless tracks. Endless tracks conventionally include an outer side with a pattern of projecting lugs (or ribs) that are designed to engage the snow or other ground surface, apply traction, and propel the vehicle. Conventional endless tracks also include an inner side that engages one or more drive sprockets, which, in turn, are operatively connected to a propulsion system of the vehicle. The drive sprockets and the inner side of the endless track typically include mating teeth that provide traction between the drive sprockets and the endless track. Conventional drive sprockets use either external (radially extending) or internal (axially extending) teeth or both.

FIG. 1 illustrates a conventional arrangement of four drive sprockets 1050, 1060. Two drive sprockets 1050 are to be disposed on outer sides of an endless track 1080, and two drive sprockets 1060 are to be disposed on a central portion of the endless track 1080. The drive sprockets 1050 include a plurality of axially-extending sprocket teeth 1070 (9 teeth) on one side thereof, while the drive sprockets 1060 include a plurality of axially-extending sprocket teeth 1070 (9 teeth) on each side thereof. In some cases, the sprockets 1050 or 1060 also have radially extending teeth. In other cases, the drive sprockets 1050, 1060 have 8 or 10 sprocket teeth 1070. The drive sprockets 1050 are used in combination with the drive sprockets 1060 to ensure sufficient application of the engine torque to the endless track 1080 without allowing ratcheting (rotation of the sprocket without equivalent rotation of the track). Only two sprockets 1050 or 1060 could also be used, if the sprockets 1050 or 1060 provided sufficient application of the engine torque to the endless track 1080.

The endless track 1080 includes a plurality of longitudinally-spaced internal track lugs (or teeth) 1090 projecting inwardly from an inner side of the endless track 1080 for contacting the drive sprockets 1050, 1060. The sprocket teeth 1070 engage the internal track lugs 1090 to provide traction between the sprocket 1050, 1060 and the endless track 1080. Alignment cleats 1085 are laterally offset from the track lugs 1090 on the endless track 1080 and the sprocket teeth 1070. The internal track lugs 1090 are disposed so as to form two outer rows 1091 and four inner rows 1092, in a longitudinal direction 1002. The rows 1091 and 1092 are disposed adjacent to each other in a lateral direction 1004, and the internal track lugs 1090 are aligned in the lateral direction 1004. A pitch 1093 between the track lugs 1090 is constant. The pitch 1093 is measured in the longitudinal direction 1002. The track 1080 also features two longitudinal rows of apertures or windows 1030. The track 1080 includes a plurality of external track lugs 1095. The external track lugs 1095 are distributed in lateral rows, and the rows are disposed at a pitch 1097 in the longitudinal direction 1002. The pitch 1097 of the external track lugs 1095 equals the pitch 1093 of the internal track lugs 1090.

While the above endless track and sprocket assembly functions to provide torque transfer while avoiding ratcheting, a greater number of sprockets is required when the sprockets do not have radially extending teeth or there is a greater amount of torque to be transferred to the track than can be applied by the sprocket assembly without ratcheting. On the other hand, when using sprockets with radially extending teeth, these sprockets are aligned with the windows of the track, and travel over the alignment cleats 1085 over which the slide rails glide. The contact between the alignment cleats 1085 and the sprocket causes undesired noise and vibration. It also requires the slide rails to be shortened due to the space required for the sprockets.

SUMMARY

It is an object of the present invention to ameliorate at least some inconveniences of the past. It is also an object to provide a sprocket and track combination that reduces the level of noise and vibration normally generated by the interaction of the two.

In one aspect, a sprocket wheel and drive track assembly of a tracked vehicle includes at least one drive sprocket, the at least one drive sprocket having a sprocket wheel and a plurality of internal teeth extending laterally therefrom. The plurality of internal teeth are distributed in a circumferential direction on a periphery of at least one side of the at least one drive sprocket. The plurality of internal teeth is disposed at a sprocket pitch from each other. A belt is in contact with the at least one drive sprocket. The belt has an inner side and an outer side. The belt has a longitudinal direction and a lateral direction. A plurality of internal lugs is distributed on the inner side of the belt. At least two of the plurality of internal lugs are engaged by at least two of the plurality of internal teeth of the at least one drive sprocket. The plurality of internal lugs is disposed to form at least one longitudinal row. At least two consecutive internal lugs of the plurality of internal lugs are disposed at a first pitch from each other. The first pitch is longer than an arc length corresponding to the sprocket pitch.

In another aspect, the first pitch is a multiple of the arc length corresponding to the sprocket pitch.

In another aspect, the first pitch is double of the arc length corresponding to the sprocket pitch.

In yet another aspect, the at least one drive sprocket is adapted to be rotated so as to engage the belt in rotation. When the at least one sprocket wheel is rotated to complete one revolution, only some of the plurality of internal teeth of the at least one drive sprocket have transferred torque to an internal lug.

In a further aspect, the at least one sprocket wheel has 16 internal teeth on each side thereof.

In an additional aspect, at least two other consecutive internal lugs of the at least one longitudinal row are disposed at a second pitch from each other. The second pitch is shorter than the first pitch. The plurality of internal lugs of the at least one longitudinal row is disposed so as to form a repeating sequence where two second pitches are followed by one first pitch consecutively.

In another aspect, the second pitch is one of equal to and smaller than the arc length corresponding to the sprocket pitch.

In another aspect, the second pitch is equal to the arc length corresponding to the sprocket pitch.

In an additional aspect, the belt further comprises a plurality of studs extending from the outer side. At least some of the studs of the plurality of studs are positioned in the longitudinal direction between consecutive internal lugs of the plurality of internal lugs that are disposed at the first pitch from each other.

In another aspect, the at least one longitudinal row includes a first row and a second row adjacent to each other in the lateral direction. The first row and the second row each have the repeating sequence. The repeating sequences of the first and second rows are longitudinally offset from each other.

In yet another aspect, the second pitch is half of the first pitch, and the repeating sequence of the first row is offset from the repeating sequence of the second row such that at least one of the two consecutive lugs of the first row disposed at the first pitch from each other is longitudinally aligned with one of the two consecutive lugs of the second row disposed at the second pitch from one another.

In a further aspect, the at least one drive sprocket includes a first drive sprocket and a second drive sprocket. The at least one longitudinal row includes a pair of first rows and a pair of second rows. The pairs of first and second rows are adjacent to each other in the lateral direction. The first drive sprocket is engaging internal lugs of the pair of first rows, and the second drive sprocket is engaging internal lugs of the pair of second rows.

In an additional aspect, at any given time, at least one sprocket tooth is immediately surrounded by two consecutive inner track lugs, and at least one other sprocket tooth of the at least one side of the drive sprocket is immediately surrounded by only one other inner track lug.

In another aspect, the at least one side of the at least one drive sprocket includes a first side and a second side. At any given time, at least one sprocket tooth on the first side of the at least one drive sprocket is immediately surrounded by two consecutive inner track lugs, and at least one other sprocket tooth on the second side of the at least one drive sprocket is immediately surrounded by only one other inner track lug. The at least one other sprocket tooth is aligned with the at least one sprocket tooth.

In another aspect, a plurality of external lugs is distributed on the outer side of the belt, the plurality of external lugs being disposed so as to form a plurality of lateral rows. The plurality of lateral rows is disposed at an external lug pitch from each other. The first pitch equals the external lug pitch.

In an additional aspect, a sprocket wheel and drive track assembly of a tracked vehicle includes at least one drive sprocket. The at least one drive sprocket has a sprocket wheel and a plurality of internal teeth extending laterally therefrom. The plurality of internal teeth is distributed in a circumferential direction on a periphery of at least one side of the at least one drive sprocket, the plurality of internal teeth is disposed at a sprocket pitch from each other. A belt is in contact with the at least one drive sprocket. The belt has an inner side and an outer side. The belt has a longitudinal direction and a lateral direction. A plurality of internal lugs is distributed on the inner side of the belt. At least two of the plurality of internal lugs is engaged by at least two of the plurality of internal teeth of the at least one drive sprocket. The plurality of internal lugs is disposed to form at least one longitudinal row. At least two consecutive internal lugs of the plurality of internal lugs is disposed at a first pitch from each other. A plurality of external lugs is distributed on the outer side of the belt. The plurality of external lugs is adapted to be in contact with a ground. The plurality of external lugs is disposed so as to form a plurality of lateral rows. The plurality of lateral rows is disposed at an external lug pitch from each other over the entirety of the outer side of the belt. The external lug pitch is longer than an arc length corresponding to the sprocket pitch.

In another aspect, at least two other consecutive internal lugs of the at least one longitudinal row are disposed at a second pitch from each other. The second pitch is shorter than the first pitch. The plurality of internal lugs of the at least one longitudinal row is disposed so as to form a repeating sequence where two second pitches are followed by one first pitch consecutively. The external lug pitch is longer than the second pitch. The external lug pitch is equal to the first pitch.

In yet another aspect, the first pitch is equal to the external lug pitch, and at least one internal lug of the at least two consecutive internal lugs is longitudinally aligned with one lateral row of the plurality of lateral rows of external lugs.

In a further aspect, at least three other consecutive internal lugs of the at least one longitudinal row are disposed at a second pitch from each other. The at least three other consecutive internal lugs including a first internal lug, a second internal lug and a third internal lug. The first internal lug is longitudinally aligned with a first lateral row of the plurality of lateral rows of external lugs. The third internal lug is longitudinally aligned with a second lateral row of the plurality of lateral rows of external lugs, the first lateral row and the second lateral row being disposed consecutively. The second internal lug is disposed between the first and third internal lug.

In another aspect, the external lug pitch is double of the arc length corresponding to the sprocket pitch.

For purposes of this application, terms related to spatial orientation such as forwardly, rearwardly, upwardly, downwardly, left, and right, are as they would normally be understood by a driver of the vehicle sitting thereon in a normal riding position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where:

FIG. 16 is a perspective view of a portion of a prior art endless belt.

DETAILED DESCRIPTION

Figure 2:
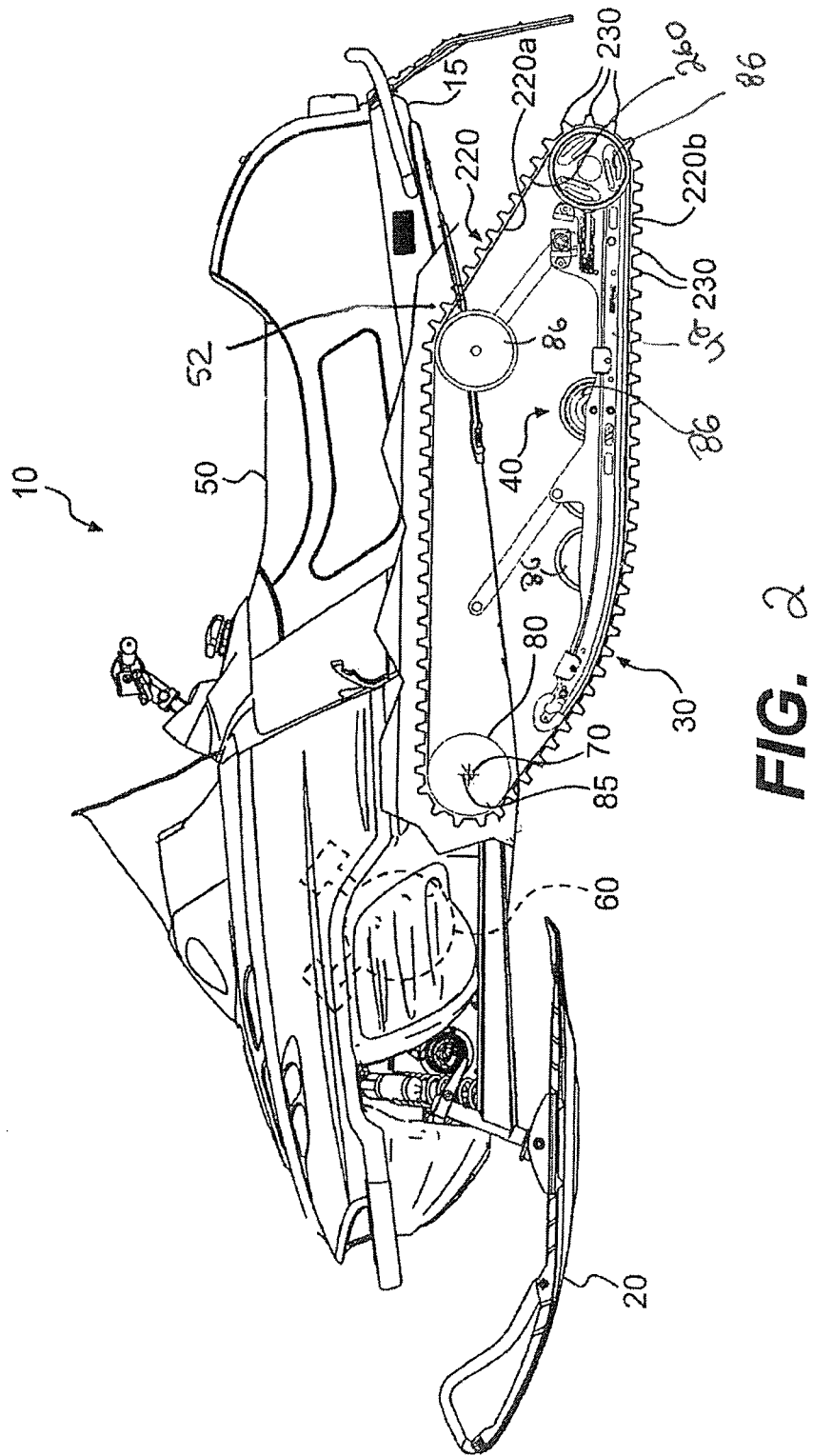
FIG. 2 is a left side elevation view of a snowmobile with a portion of the tunnel broken away to show the endless track and associated components.

As illustrated in FIG. 2, a snowmobile 10 according to an embodiment of the present invention includes a frame 15 that supports a pair of selectively steerable skis 20 and a straddle-type seat 50. An endless track 30 is supported by the frame 15 through a slide rail suspension system 40. The frame 15 includes a tunnel 52 onto which the seat 50 is disposed. The slide rail suspension system 40 includes at least slide rails 42 and several idler wheels 86. Other components of the suspension system, being well known in the art, it will not be described herein.

Figure 1:
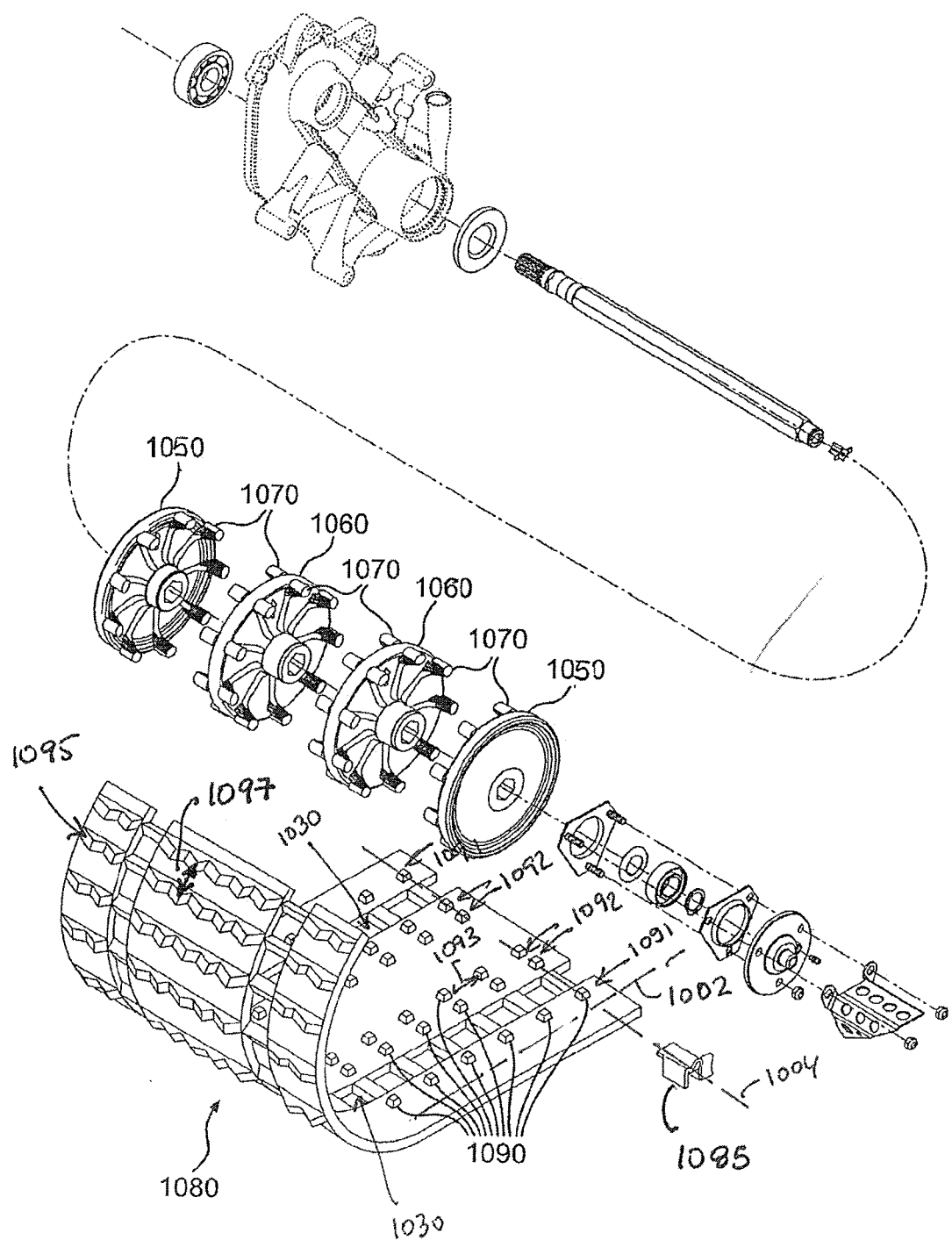
FIG. 1 is a partially exploded view of a plurality of drive sprockets and an endless belt according to the prior art.

The snowmobile 10 includes a propulsion unit 60 (shown in phantom), such as an internal combustion engine, that is operatively connected to the endless track 30 via a drive axle 70. A continuously variable transmission (not shown) connects the propulsion unit 60 to the drive axle 70. Two drive sprockets 80 (only a left one being shown in FIG. 2) are mounted to the drive axle 70 for common rotational movement about a drive sprocket axis 85. It is contemplated that only one or more than two drive sprockets 80 could be mounted on the drive axle 70. Each sprocket 80 includes two sets of sprocket teeth 90, 100 (shown in FIG. 3) that engage corresponding internal lugs (or track lugs, or track teeth) 260 of the endless track 30 to provide traction between the sprockets 80 and the endless track 30. As illustrated in FIG. 4, because the sprocket teeth 90, 100 and inner track lugs 120, 130 provide substantial traction between each sprocket 80 and the endless track 30, only two sprockets 80 are required. This reduces the weight of the moving parts of the snowmobile 10 as compared to conventional foursprocket arrangements (see e.g. FIG. 1). While two sprockets 80 are used in the illustrated embodiments, greater or fewer sprockets 80 may alternatively be used. Additionally, a sprocket 80 may be used in conjunction with one or more conventional sprockets such as the previously described sprockets 1050, 1060.

Figure 3:
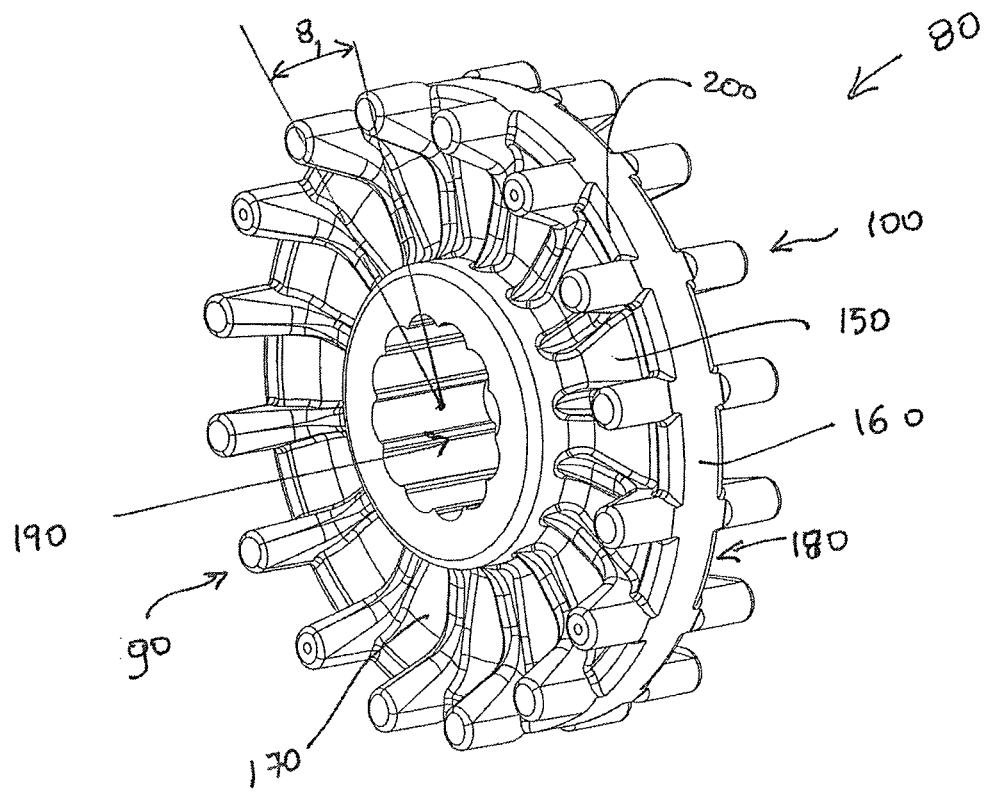
FIG. 3 is a perspective view taken from a rear, left side of a drive sprocket of the snowmobile of FIG. 2.
Figure 4:
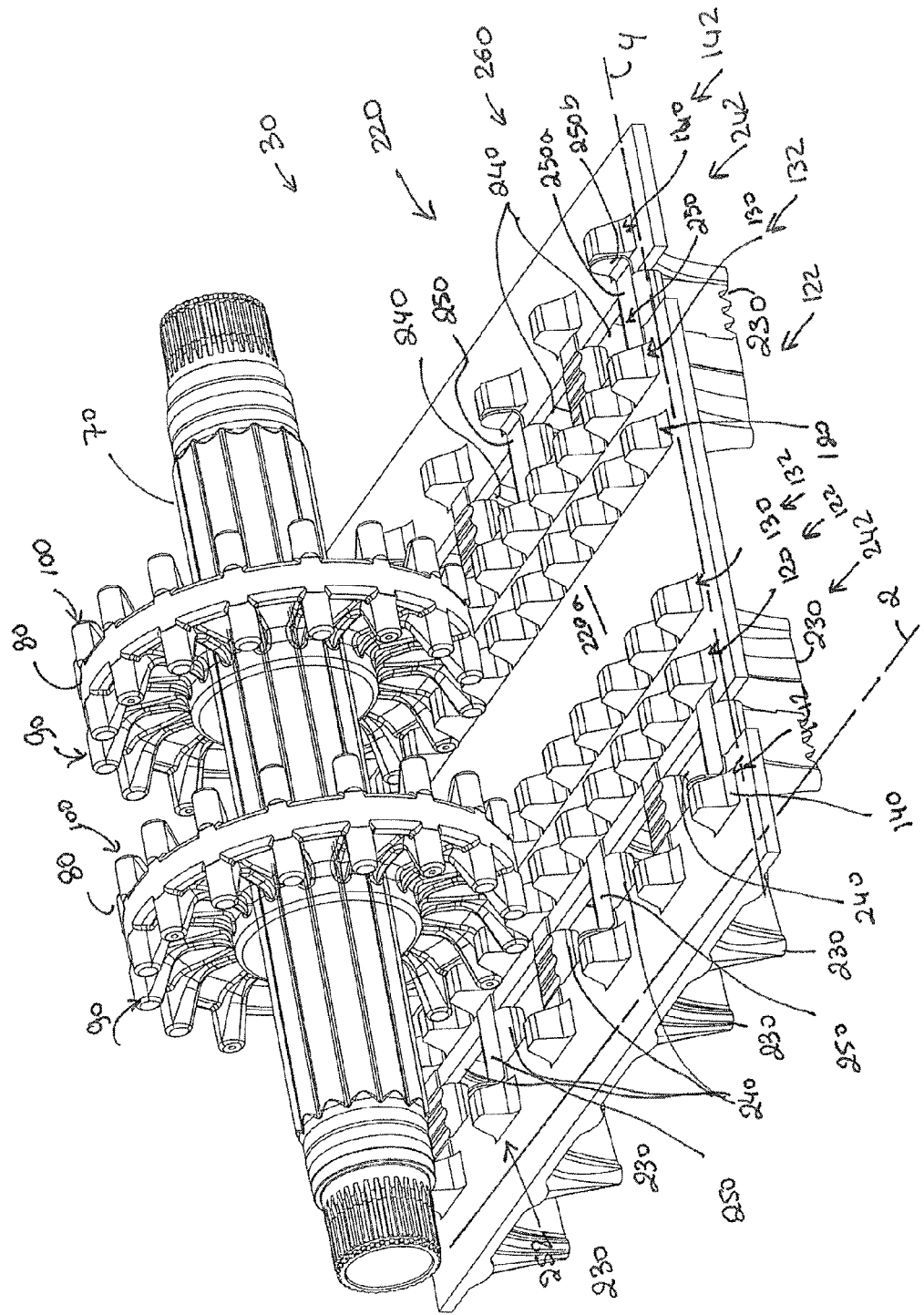
FIG. 4 is a perspective view taken from a rear, left side of drive sprockets, a drive axle, and a portion of an endless belt of the snowmobile of FIG. 2 according to a first embodiment.

Referring specifically to FIG. 3, the two drive sprockets 80 (left and right) being identical, only a left drive sprocket 80 will be described. The drive sprocket 80 comprises a generally disc-shaped sprocket wheel 150 that has an outer perimetrical surface 160 and two opposing axial surfaces 170, 180. The sprocket wheel 150 has a central bore 190 through which the drive axle 70 extends. The bore 190 and the drive axle 70 have mating cross-sections that rotationally secure the sprocket 80 to the drive axle 70. Alternative methods of rotationally securing the sprocket 80 to the drive axle 70 may also be used (e.g., a key and keyway, square cross-sections, radial pins, etc.). The sprocket wheel 150 has a diameter of 7 inches (17.78 cm). It is contemplated that the diameter of the sprocket wheel 150 could be other than 7 inches. For example, the diameter of sprocket wheel 150 could be 6 inches (15.24 cm).

The sprocket teeth 90 comprise circumferentially-spaced teeth that project axially outwardly from the axial surface 170, and the sprocket teeth 100 comprise circumferentially-spaced teeth that project axially outwardly from the axial surface 180. The sprocket teeth 100 are mirror images of the sprocket teeth 90. It is contemplated that the sprocket teeth 90, 100 could be different from each other. The drive sprocket 80 has 16 sprocket teeth 90 and 16 sprocket teeth 100, which is a higher number than previously seen in the prior art (e.g. see FIG. 1). It is contemplated that the drive sprocket 80 could have more or less than 16 sprocket teeth 90 and 16 sprocket teeth 100.

Consecutive sprocket teeth 90 are disposed at a sprocket pitch 8 from each other. Consecutive sprocket teeth 100 are also disposed at a sprocket pitch 8 from each other. The sprocket pitch 8 is 22.5 degrees. It is contemplated that the sprocket pitch 8 could be more or less than 22.5 degrees depending on the number of sprocket teeth 90, 100. For example the sprocket pitch 8 could be 40 degrees if the sprocket 80 had nine teeth. It is also contemplated that the sprocket teeth 90 could have a sprocket pitch different from a sprocket pitch of the sprocket teeth 100. The sprocket pitch 8 is determined in conjunction with a pitch between the plurality of internal lugs 260 in order to ensure traction. The sprocket teeth 90, 100 are preferably axially aligned to each other such that each sprocket tooth 90 is disposed at the same circumferential position as a corresponding one of the sprocket teeth 100. It is contemplated that the sets of sprocket teeth 90, 100 could be offset in the circumferential direction. Sprocket valleys 200 are formed between consecutive sprocket teeth 90, and between consecutive sprocket teeth 100.

The sprocket wheel 150 and the sprocket teeth 90, 100 are integrally formed. To reduce the weight of the snowmobile 10, the sprocket 80 is made of a strong, light material (such as plastic). It is contemplated that the sprocket 80 could be made of any other material including steel or a composite material including aluminum. It is also contemplated that the sprocket 80 could be made from a composite including carbon fibers. A composition of the sprocket 80 may be selected from a wide variety of substances. It is contemplated that the sprocket teeth 90, 100 could be formed separately from the sprocket wheel 150 and subsequently rigidly fastened (via rivets, welds, bolts, etc.) to the sprocket wheel 150.

Referring more specifically to FIGS. 4-7, a first embodiment of the endless track 30 will be described. The endless track 30 has an endless flexible belt 220 which has an inner side 220a (best shown in FIG. 6) and an outer side 220b (best shown in FIG. 7). The endless track 30 includes a plurality of external lugs (or ribs) 230 that project from the outer side 220b to give the endless track 30 traction against the snow as the endless track 30 propels the snowmobile 10, and a plurality of internal lugs 260 that project from the inner side 220a. The endless track 30 defines a longitudinal direction 2 (shown in FIG. 4) and a lateral direction 4 (shown in FIG. 4). The endless track 30 comprises a strong, flexible material such as rubber reinforced with fabric and metal. The endless belt 220, the external lugs 230 and the internal lugs 260 are integrally formed with each other. The endless belt 220 has a width (measured in the lateral direction 4) of 16 inches (40.64 cm). It is contemplated that the width of the endless belt 220 could be more or less than 16 inches. For example, the width of the endless belt 220 could be 15 inches (38.1 cm), 20 inches (50.8 cm) or 24 inches (60.96 cm). A length of the endless belt (measured in the longitudinal direction 2) is 137 inches (347.98 cm). It is contemplated that the length of the endless belt 220 could be more or less than 137 inches. For example, the length of the endless belt 220 could be 121 inches (307.34 cm), 154 inches (391.16 cm), 156 inches (396.24 cm) or 163 inches (414.02 cm).

The plurality of internal lugs 260 includes inner track lugs 120, 130 and outer track lugs 140 which project inwardly from the inner side 220a of the endless belt 220. The inner track lugs 120, 130 come in contact with the two sprockets 80 for providing traction to the snowmobile 10, while the outer track lugs 140 are in contact with the slide rails 42 for ensuring that the endless belt 220 stays in alignment. The slide rails 42 are sliding in a space defined between the outer track lugs 140 and inner track lugs 120 on the left side, and between the outer track lugs 140 and inner track lugs 130 on the right side. It is contemplated that that the outer track lugs 140 could be in contact with sprockets other than the sprockets 80 mounted onto the drive axle 70. A height 15 (measured in a direction perpendicular to the longitudinal direction 2 and the lateral direction 4) of the internal lugs 230 is about 0.5 inches (1.27 cm). It is contemplated that the height 15 could be more or less than 0.5 inches.

Figure 6:
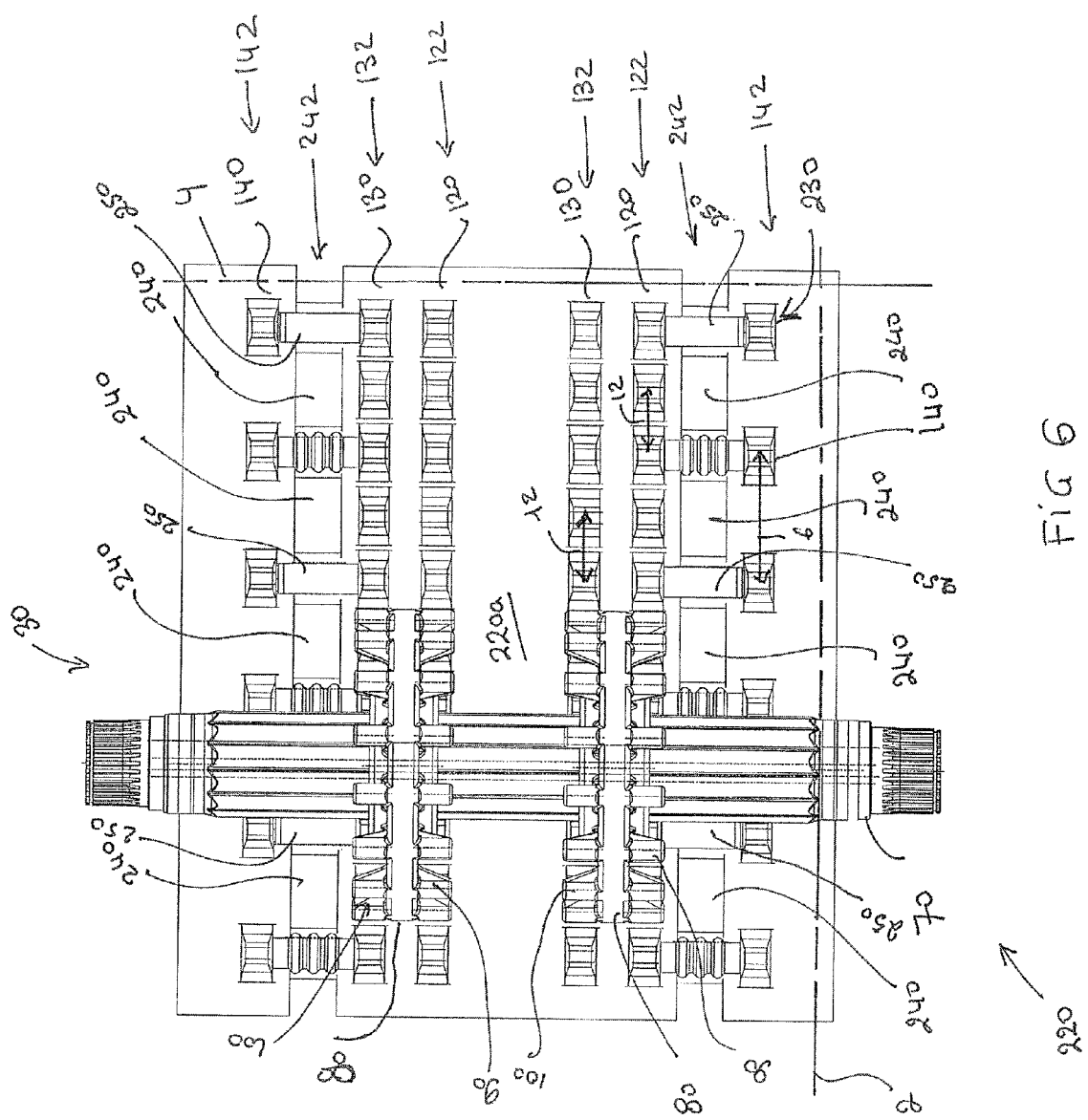
FIG. 6 is a top plan view of the drive sprockets, the drive axle, and the endless belt of FIG. 4.

As best seen in FIG. 6, the inner track lugs 120, 130 each form longitudinal rows 122, 132, and the outer track lugs 140 each form longitudinal rows 142. The inner track lugs 120 are aligned with the inner track lugs 130 in the longitudinal direction 2.

The outer internal lugs 140 are spaced at an outer lug pitch 6 of 2.86 inches (7.26 cm). The outer lug pitch 6 is measured in the longitudinal direction 2. It is contemplated that the outer lug pitch 6 could be more of less than 2.86 inches. For example, the outer lug pitch 6 could be 2.52 inches (6.4 cm). The inner track lugs 120 and the inner track lugs 130 are spaced at an inner lug pitch 12 of 1.43 inches (3.63 cm). The inner lug pitch 12 is measured in the longitudinal direction 2. It is contemplated that the inner lug pitch 12 could be more of less than 1.43 inches. For example, the inner lug pitch 12 could be 1.26 inches (3.23 cm). It is also contemplated that the inner lug pitch of the inner track lugs 120 could be different from the inner lug pitch of the inner track lugs 130. As will be described below for a second and third embodiment of the endless drive track 30, it is also contemplated that more than one inner lug pitch could define distances between two consecutive inner track lugs 120 and/or two consecutive inner track lugs 130.

A plurality of longitudinally spaced apertures (or windows) 240 are defined in the endless belt 220. The plurality of spaced apertures 240 is disposed into two longitudinal rows 242. It is contemplated that the plurality of longitudinally spaced apertures 240 could be omitted. It is contemplated that the plurality of longitudinally spaced apertures 240 could be disposed in a fashion other than in a longitudinal row. It is also contemplated that the plurality of longitudinally spaced apertures 240 could form only one row 242 or more than two rows 242.

The endless track 30 also comprises a plurality of alignment cleats 250 that are mounted onto the outer track lugs 140 and extend in between the apertures 240. Each cleat 250 includes a base portion 250a and a cleat portion 250b. The base portion 250a has a generally C-shaped cross-section that wraps around the inner track lugs 120, 130. The cleat portion 250b projects inwardly away from the inner side 220a of the belt 220. The alignment cleats 250 preferably comprise a strong, light, stamped sheet of metal such as steel. As would be appreciated by those skilled in the art, however, any other suitable material (e.g., aluminum, etc.) may be used. Moreover, the cleats 250 need not be stamped from a metal sheet but may be cast or molded into the appropriate configuration.

Figure 5:
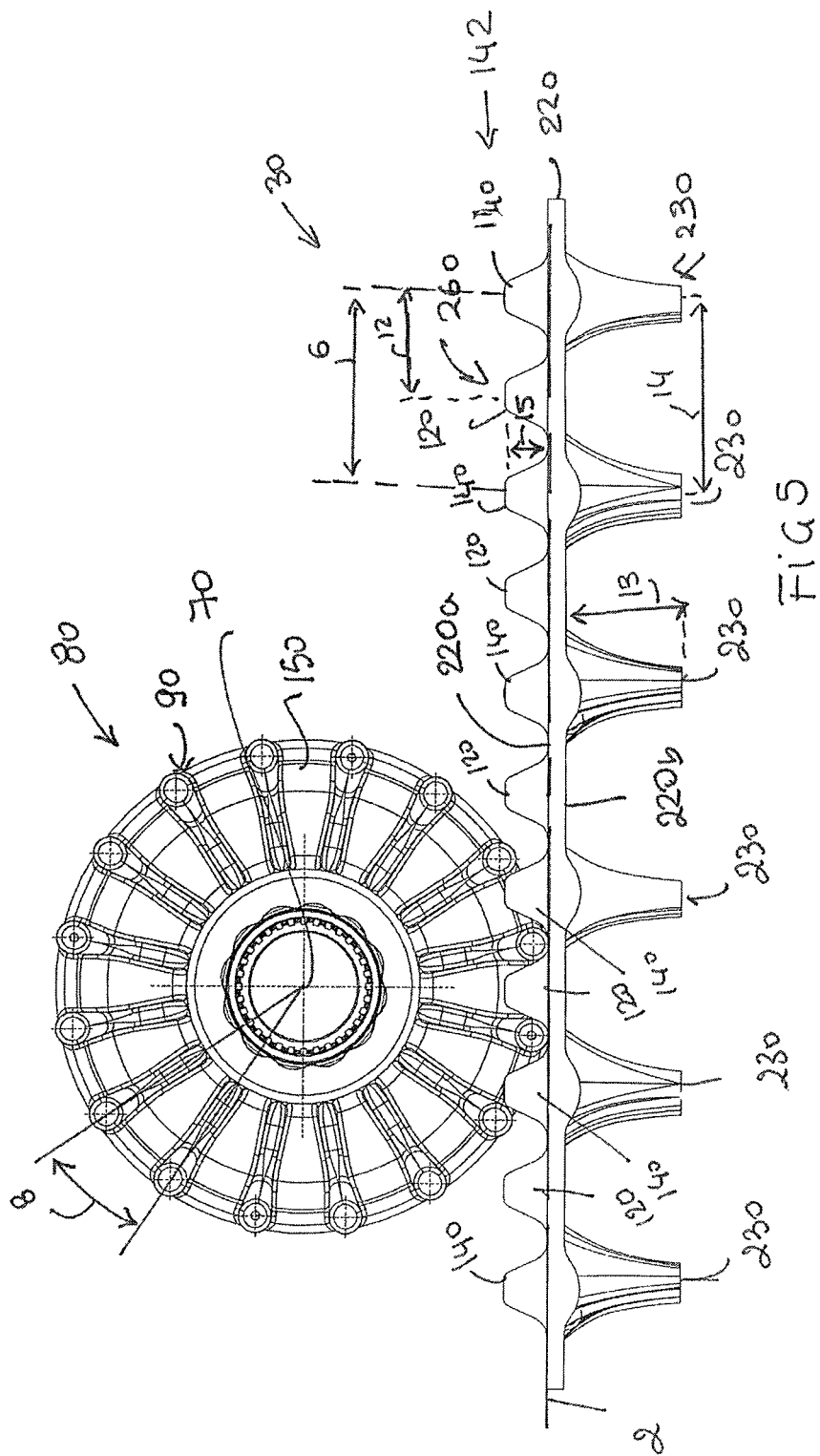
FIG. 5 is a left side elevation view of the drive sprockets, the drive axle, and the endless belt of FIG. 4.
Figure 7:
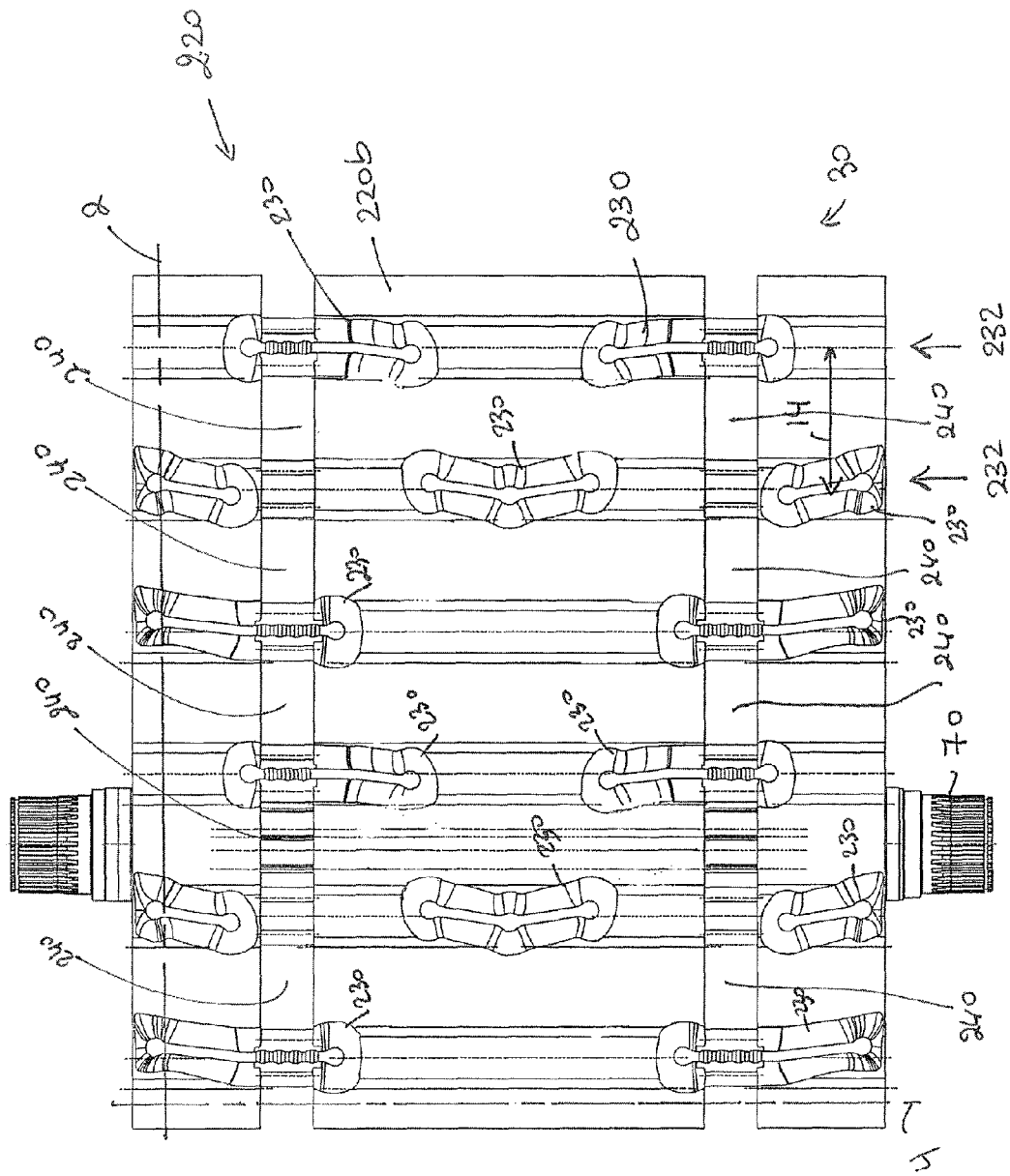
FIG. 7 is a bottom plan view of the drive sprockets, the drive axle, and the endless belt of FIG. 4.

As best seen in FIG. 7, the plurality of external lugs 230 is distributed into a plurality of external lug lateral rows 232. Each external lug lateral row 232 contains either two external lugs 230 or three external lugs 230 disposed in a repeating sequence. It is contemplated that the repeating sequence could be different from the one shown in FIG. 7. The external lugs 230 include three different designs of external lugs. It is contemplated that the external lugs 230 could include more or less than three different designs of external lugs. The external lug lateral rows 232 are disposed at an external lug pitch 14 of 2.86 inches (7.26 cm) (shown in FIG. 5). The external lug pitch 14 is measured in the longitudinal direction 2. As best seen in FIG. 5, the external lug pitch 14 equals the outer lug pitch 6. It is contemplated that the external lug pitch 14 could be smaller or greater than the outer lug pitch 6. It is contemplated that the external lug pitch 14 could be more or less than 2.86 inches. For example, the external lug pitch 14 could be 2.52 inches (6.4 cm). It is also contemplated that more than one external lug pitch 14 could exist between the external lug longitudinal rows 232. A height 13 (measured in a direction perpendicular to the longitudinal direction 2 and the lateral direction 4) of the external lugs 260 is 1.25 inches (3.17 cm). It is contemplated that the height 13 could be more or less than 1.25 inches. For example, the height of the external lugs 260 could be 0.75 (1.905 cm), 1 inch (2.54 cm), 1.5 inches (3.81 cm), 1.75 inches (4.44 cm), 2 inches (5.08 cm), 2.25 inches (5.71 cm) or 2.5 inches (5.715 cm). As will be described below, studs could be extending from the outer surface 220b for additional gripping to the ground.

Figure 8:
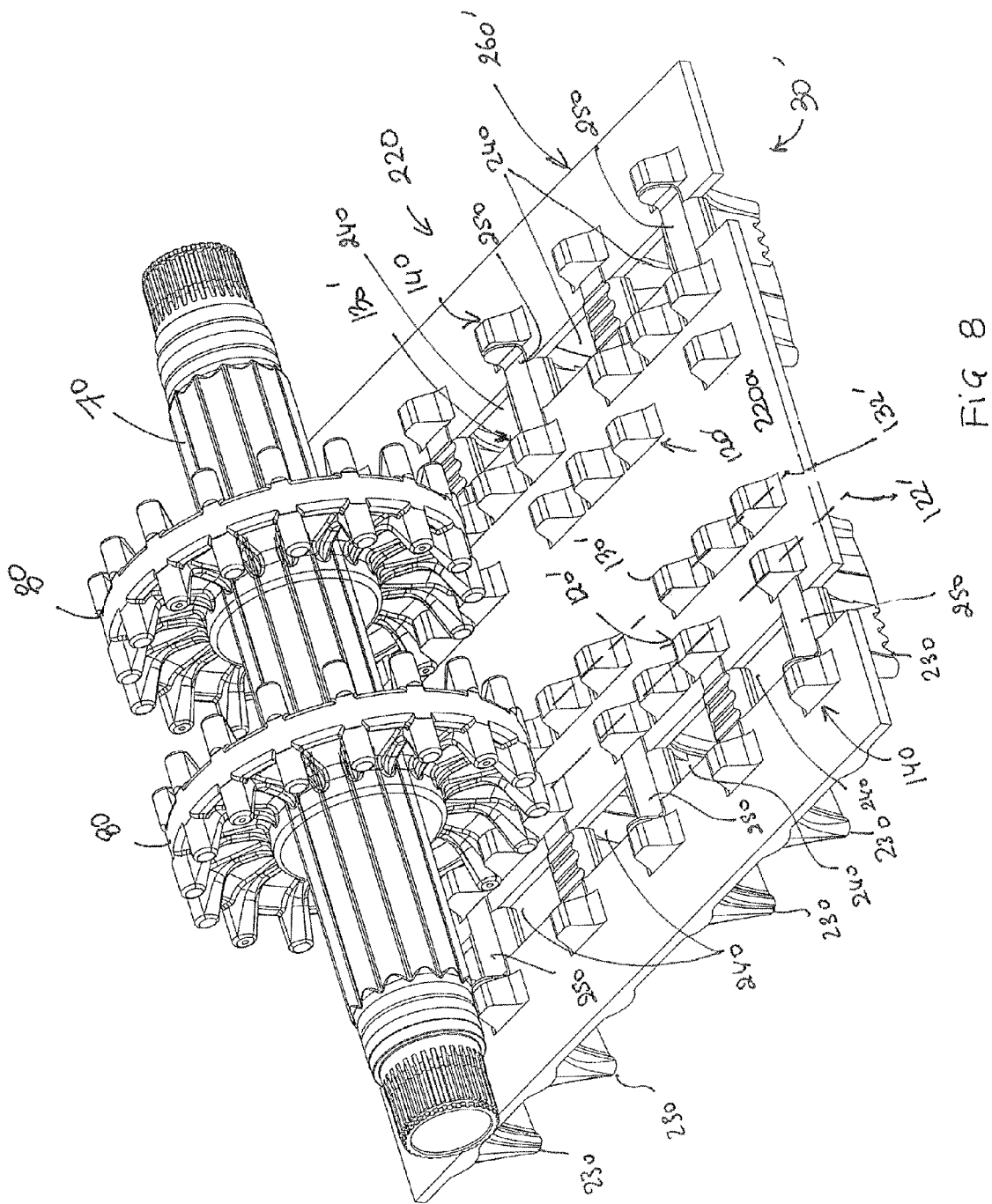
FIG. 8 is a perspective view taken from a rear, left side of drive sprockets, a drive axle, and a portion of an endless belt of the snowmobile of FIG. 2 according to a second embodiment.
Figure 9:
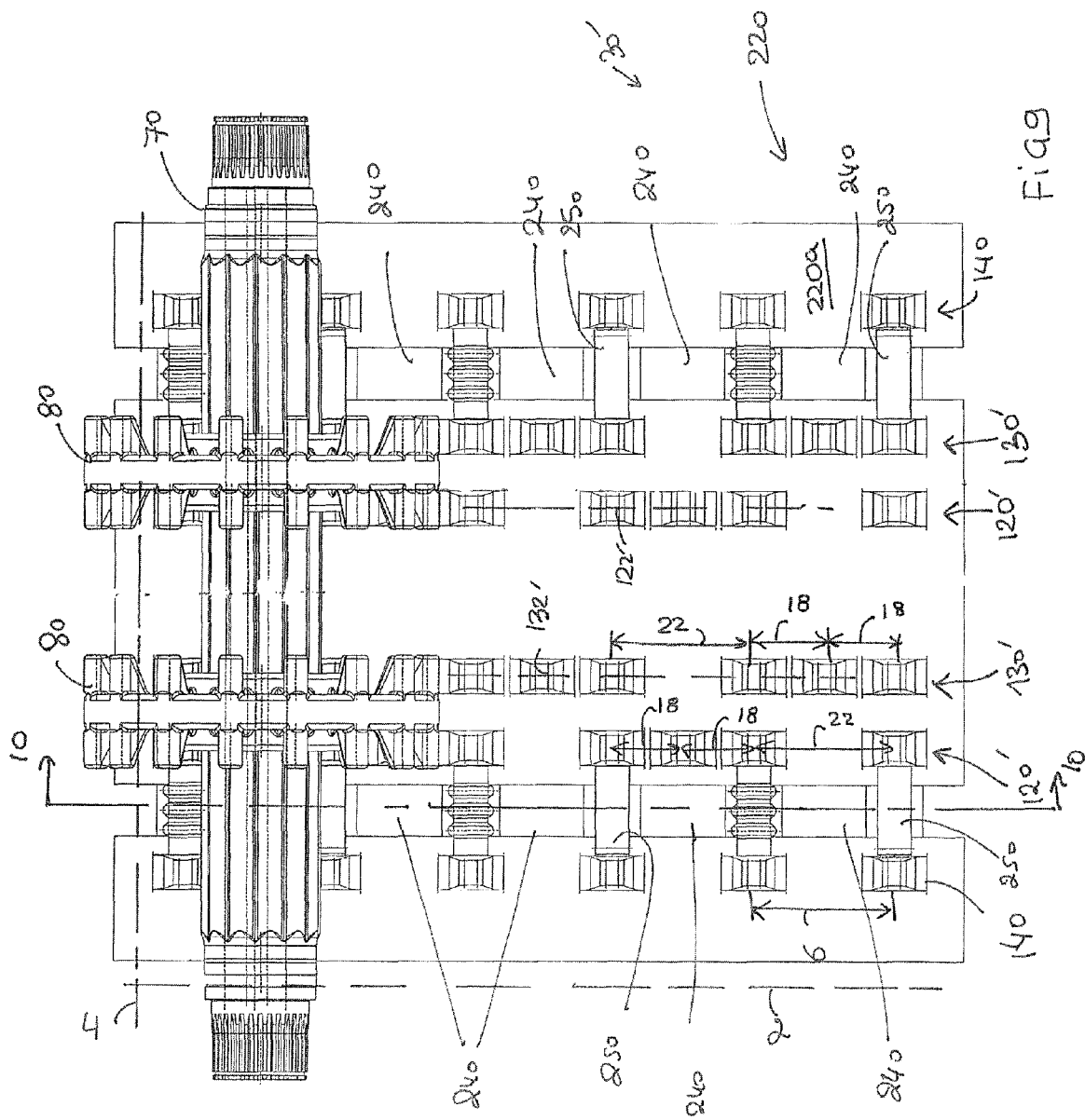
FIG. 9 is a top plan view of the drive sprockets, the drive axle, and the endless belt of FIG. 8.
Figure 10:
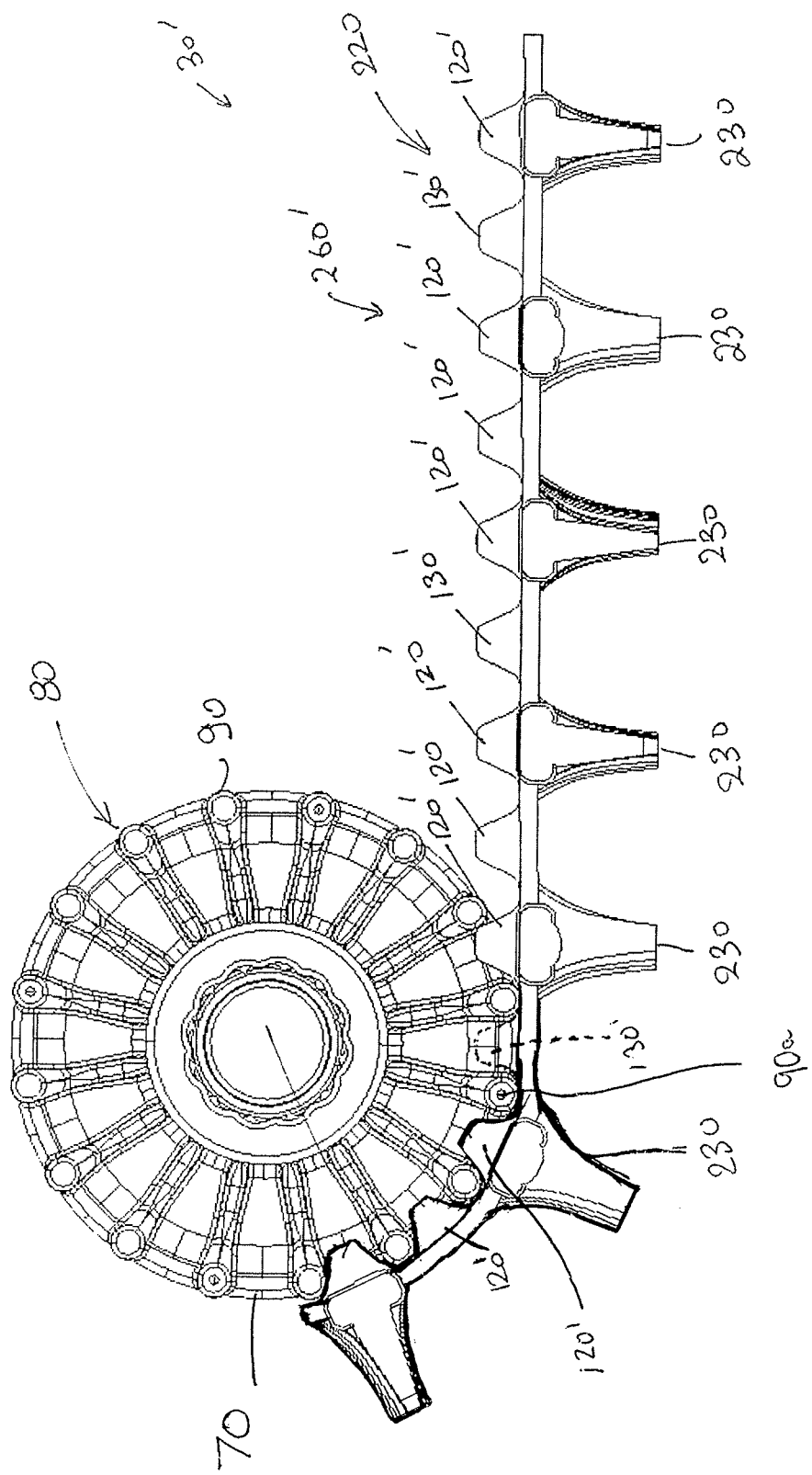
FIG. 10 is a cross-sectional view taken along line 10-10 in FIG. 9 of the drive sprockets, the drive axle, and the endless belt of FIG. 8.
Figure 11:
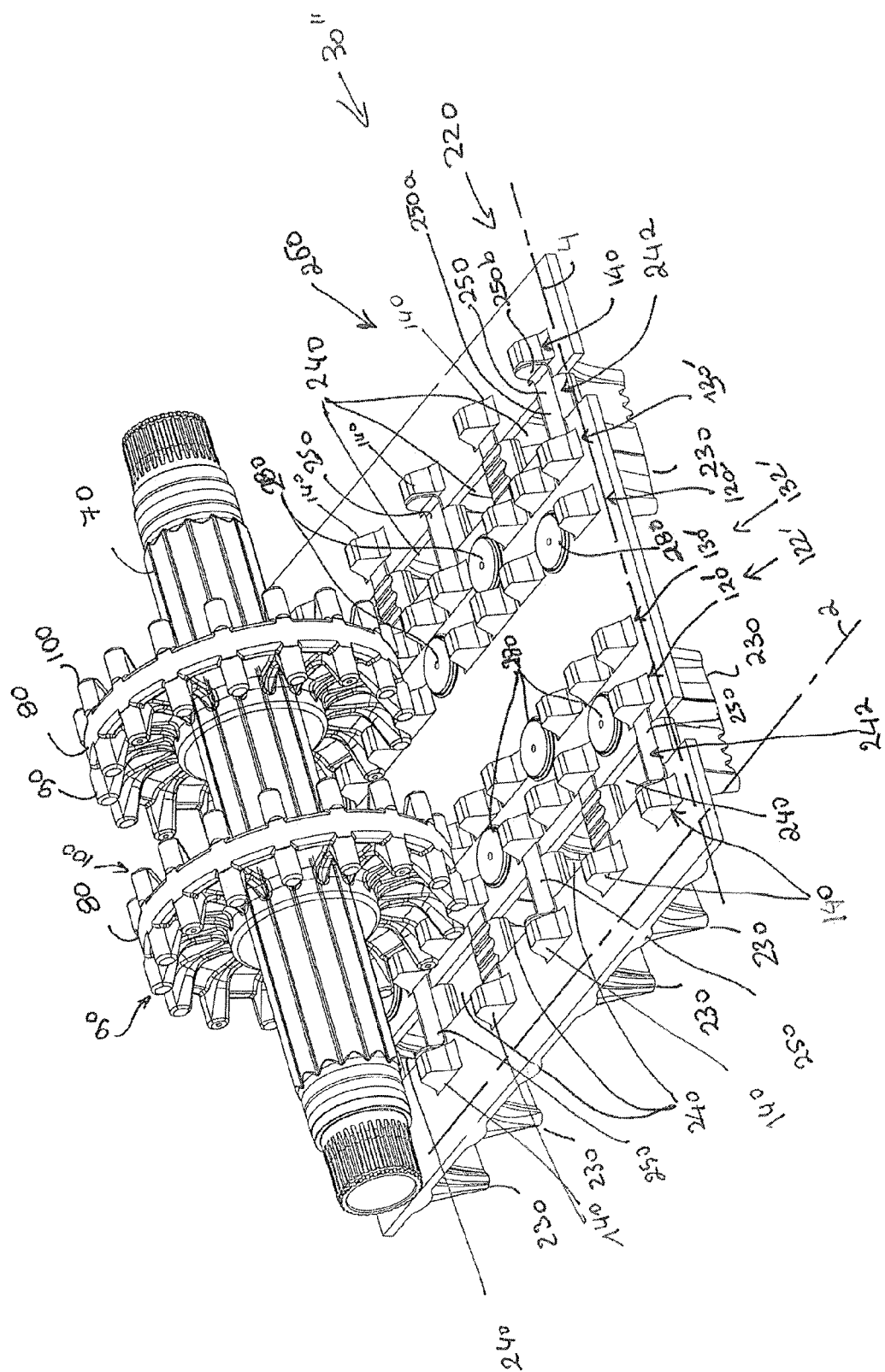
FIG. 11 is a perspective view taken from a rear, left side of drive sprockets, a drive axle, and a portion of an endless belt of the snowmobile of FIG. 2 according to a third embodiment.
Figure 12:
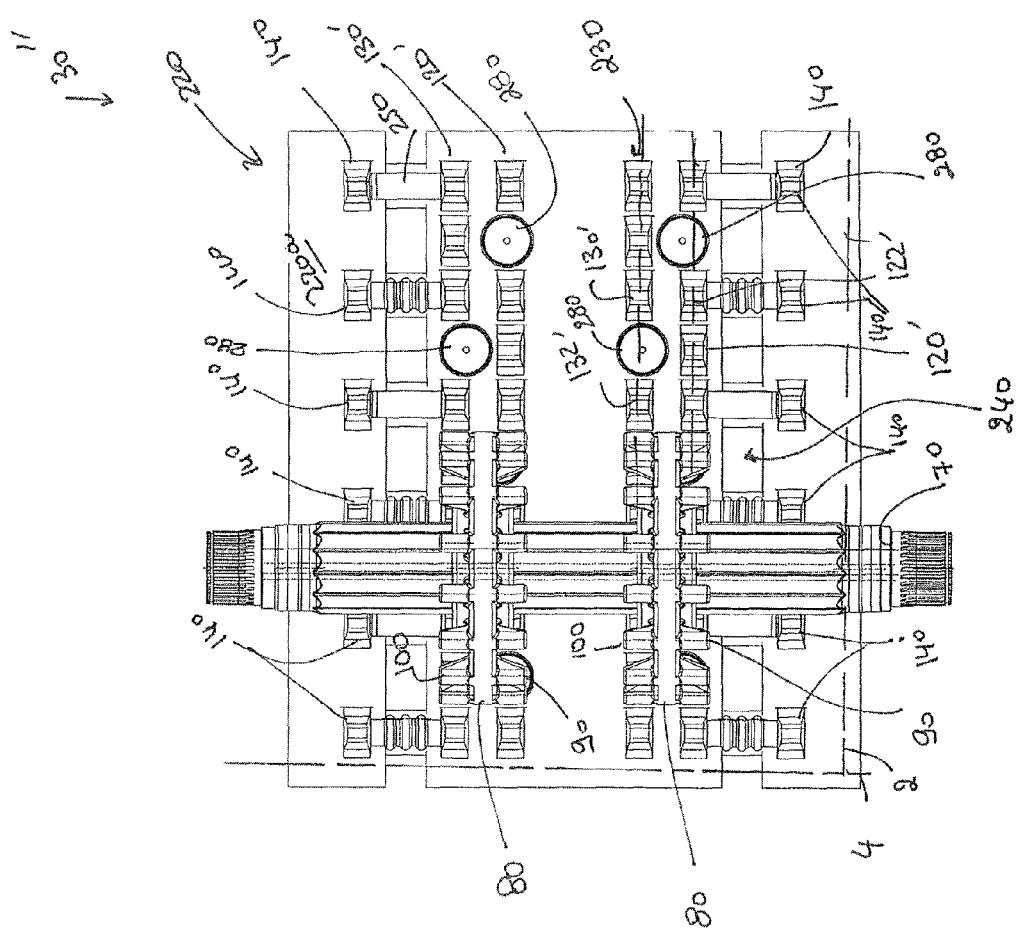
FIG. 12 is a top plan view of the drive sprockets, the drive axle, and the endless belt of FIG. 11.
Figure 13:
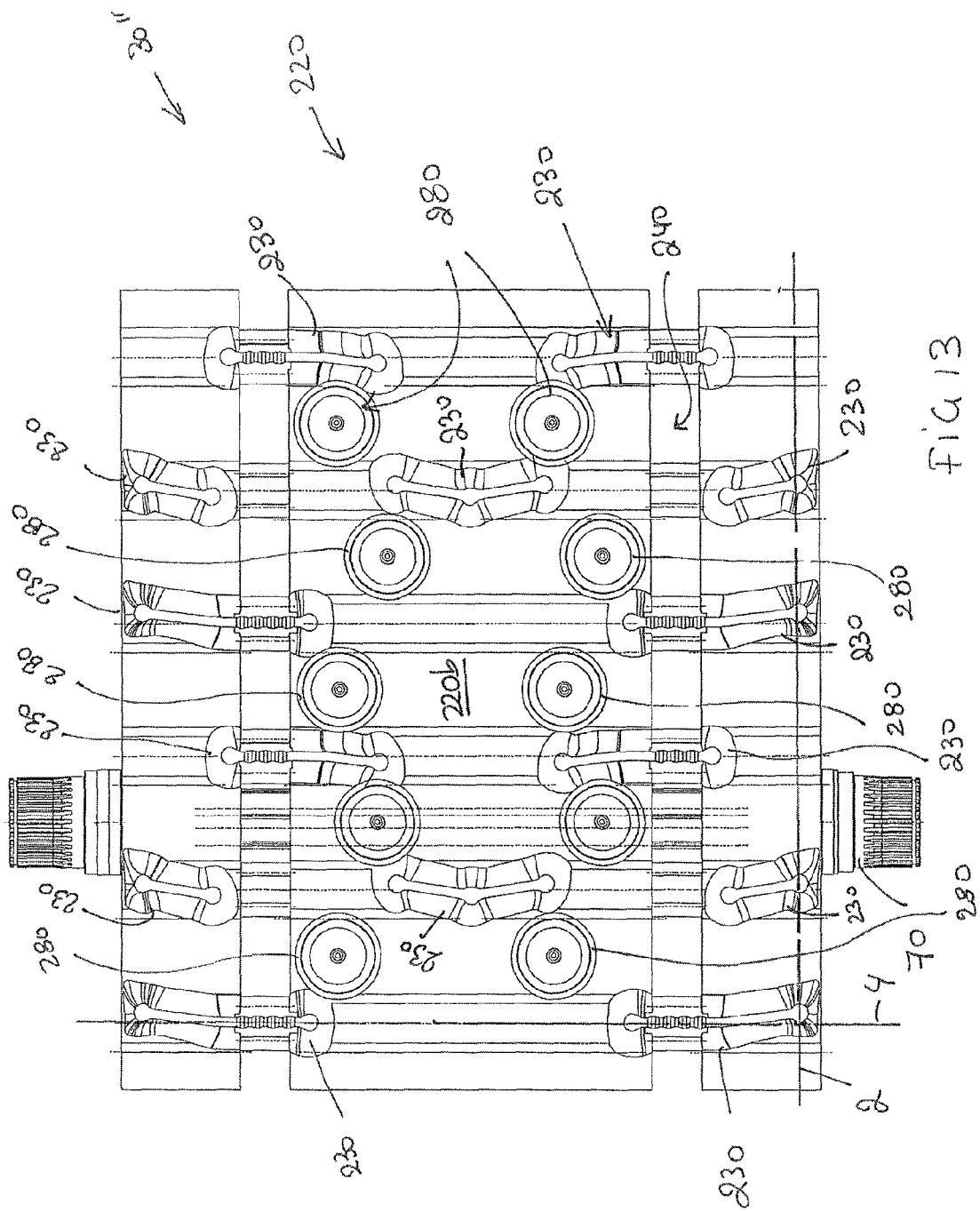
FIG. 13 is a bottom plan view of the drive sprockets, the drive axle, and the endless belt of FIG. 11.

Turning now to FIGS. 8 to 10, a second embodiment of an endless track 30' will be described.

The endless track 30' has features similar to the ones of the endless track 30. These features will be referred to using the same reference numerals as the ones of the endless track 30, and will not be described in greater details herein again.

The endless track 30' includes a plurality of internal lugs 260' on an inner face 220a of the endless belt 220. The plurality of internal lugs 260' includes the outer track lugs 140 and inner track lugs 120', 130'. The inner track lugs 120' form two inner track lug longitudinal rows 122', and the inner track lugs 130' form two inner track lug longitudinal rows 132' disposed similarly as the inner track lug longitudinal rows 120, 130.

The inner track lugs 120' are distributed along the inner track lug longitudinal rows 122' in a repeating sequence that uses a pitch 18 and at a pitch 22, both measured in the longitudinal direction 2 between two consecutive inner track lugs 120'. The pitch 18 is half of the pitch 22, and equals the pitch 6 of the inner track lugs 120, 130. As best seen in FIG. 9, the repeating sequence of pitches is two pitches 18 followed by a pitch 22. It is contemplated that the pitch 18 could be more or less than half of the pitch 22. The pitch 22 equals the pitch 6 of the outer track lugs 140. It is contemplated that the pitch 22 could be different from the pitch 6. It is also contemplated that the repeating sequence could be different. For example, the repeating sequence could feature three different pitches. The inner track lugs 130' are arranged in the same repeating sequence as the inner track lugs 120'.

The repeating sequences of the inner track lug longitudinal rows 122', 132' are offset from each other. Thus at any given time, at least one side of each drive sprocket 80 has two consecutive teeth 90 or 100 in contact with the inner track lugs 120' or 130'. It is contemplated that the inner track lug longitudinal rows 122', 132' could be disposed such that the repeating sequences of the inner track lugs 120', 130' are aligned in the longitudinal direction 2. As best shown in FIG. 10, because the repeating sequence features inner track lugs 120', 130' that are distanced apart by the pitch 22 being twice of the corresponding sprocket pitch 8, there are times when the drive sprocket 80 rotates where some of the sprocket teeth 90, 100 are not immediately surrounded by two inner track lugs 120', 130'. As best seen in FIG. 10 for a sprocket 90a, when the sprocket tooth 90a is not immediately surrounded (front/back) by two inner track lugs 120', the sprocket tooth 100 (shown in phantom) on the opposite side of the sprocket 80, aligned with the sprocket tooth 90a, is surrounded by two inner track lugs 130'. Similarly, when a sprocket tooth 100 is not immediately surrounded (front/back) by two inner track lugs 130', the sprocket tooth 90 on the opposite side of the sprocket 80, aligned with the sprocket tooth 100, is surrounded by two inner track lugs 120'.

Turning now to FIGS. 11 to 14, a third embodiment of an endless track 30" will be described.

The endless track 30" has features similar to the ones of the endless track 30'. These features will be referred to using the same reference numerals as the ones of the endless track 30', and will not be described in greater details herein again.

Figure 14:
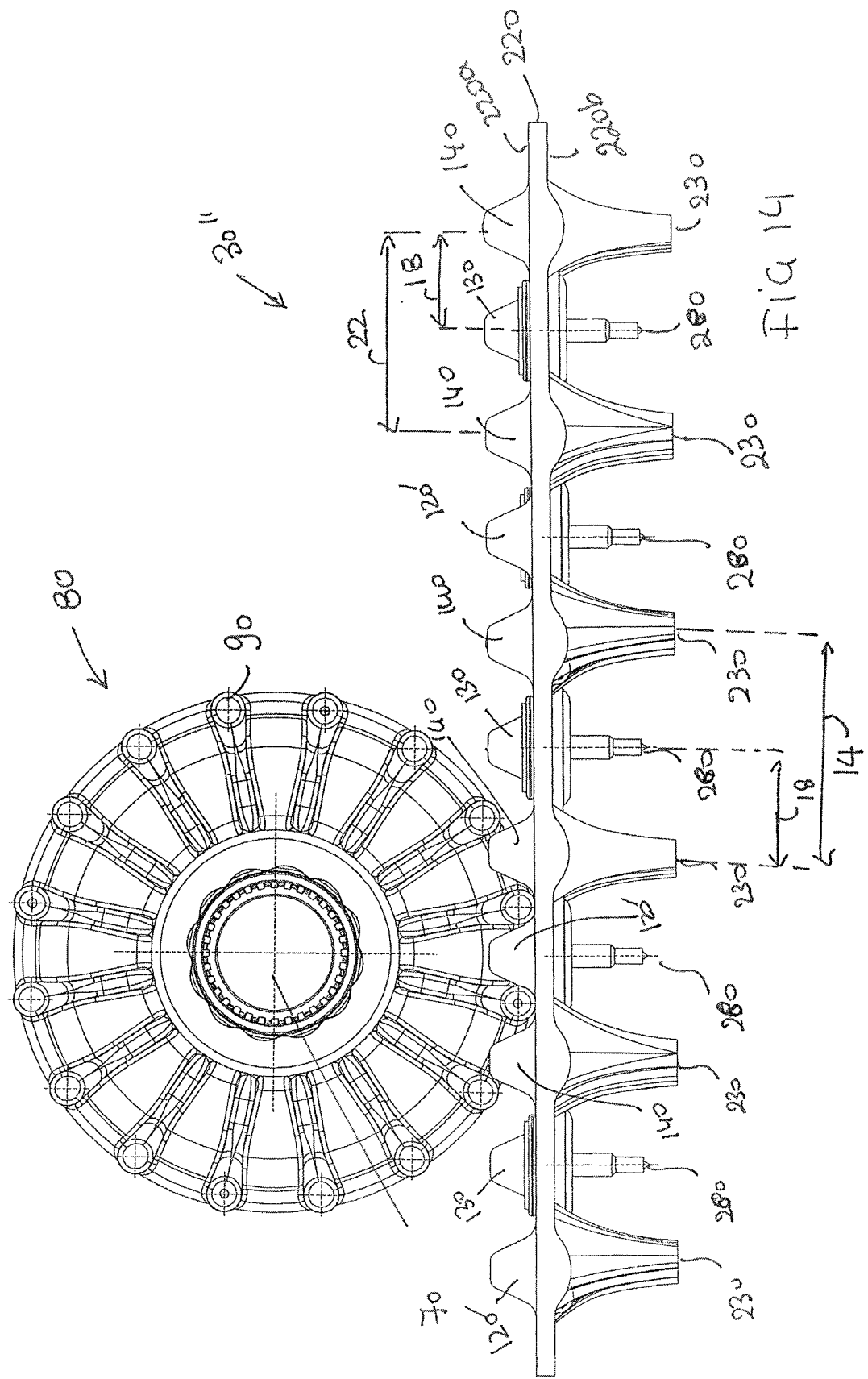
FIG. 14 is a left side elevation view of the drive sprockets, the drive axle, and endless belt of FIG. 11.

The endless belt 220 has a plurality of studs 280 extending therethrough. The studs 280 are used for enhanced contact with the ground. As best seen in FIG. 14, the studs 280 have a pointy end extending from the outer side 220b of the endless belt 220. The studs 280 are disposed along the inner track lug longitudinal rows 122' and 132', in between two consecutive inner track lugs 120' and 130' that are spaced by the pitch 22. The studs 280 are disposed halfway in the longitudinal direction 2 between the consecutive inner track lugs 120' (or 130' as the case may be). A distance between a center of a stud 280 and a consecutive inner track lugs 120' (or 130') or a consecutive outer track lug 230 in the longitudinal direction 2 equals the pitch 18. It is also contemplated that the studs 280 could be disposed only in between some of those consecutive inner track lugs 120' (and 130') that are distanced apart by the pitch 22. As the drive sprocket 80 rotates, there are times where the sprocket teeth 90, 100 come into contact with a flat top of the studs 280.

Figure 15:
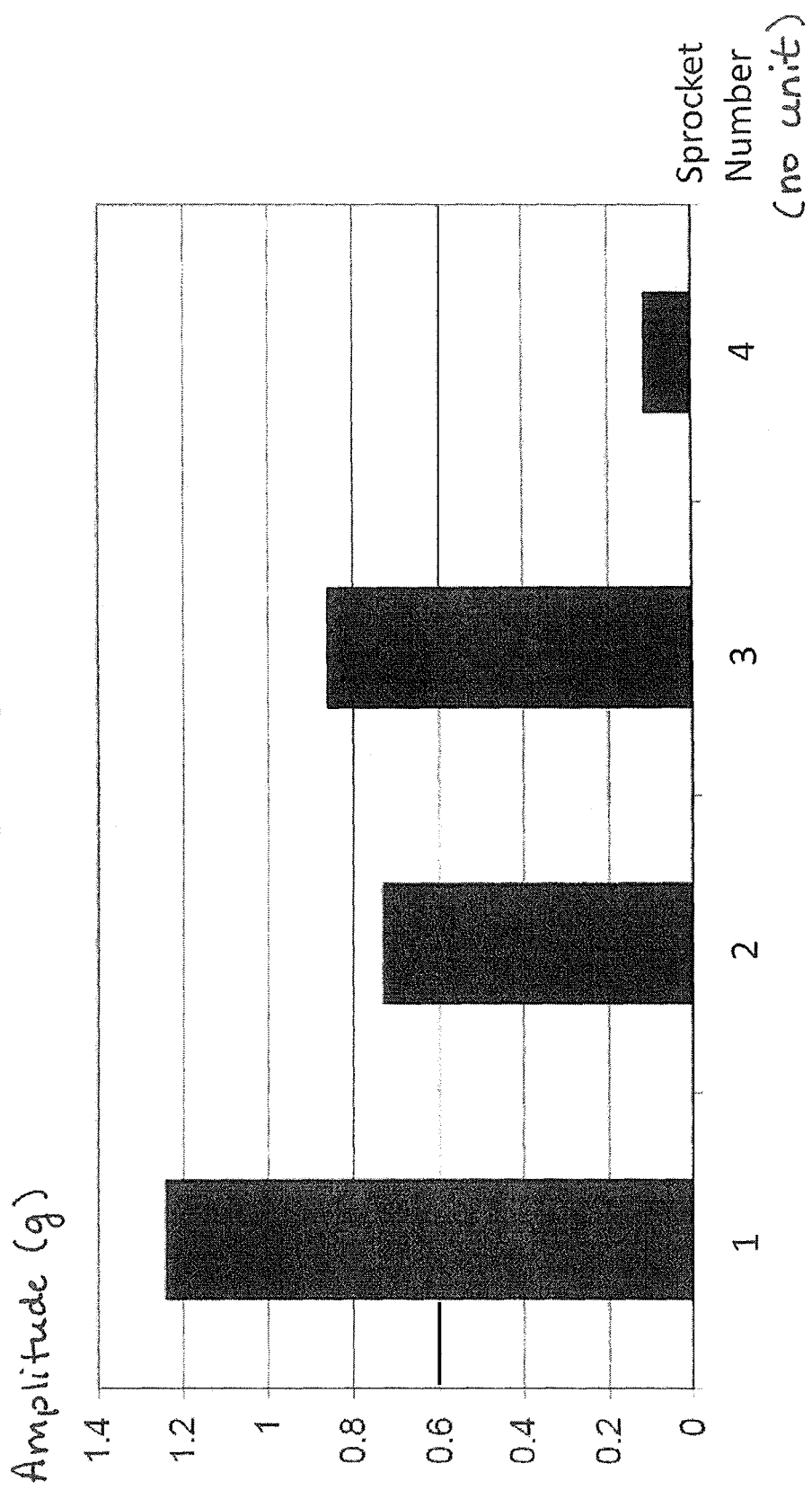
FIG. 15 is a graph illustrating level of vibration for different sprockets and endless belt combinations.

As best seen in FIG. 15 for the endless track 30, one of the advantages of the endless tracks 30, 30', 30" and sprocket assemblies is a reduction of vibration transferred to the tunnel 52 compared with the prior art assemblies. Vibration in the tunnel 52 is measured using an acceleration sensor (not shown) attached to a vertical side portion (not shown) of the snowmobile tunnel 52 in the vicinity of the drive axle 70. The acceleration sensor measures an amplitude of vibration in g (m.s-2). The experiment set up involves two drive sprocket mounted on a drive axle.

In FIG. 15, a level of vibration is measured for different sprockets in contact with an endless belt 1080' of the prior art (shown in FIG. 16) and compared with the sprocket 80 in contact with the endless belt 220. Sprocket #1 is a sprocket having 8 internal teeth (i.e. teeth extending axially on both sides of the sprocket) in line with windows 1030' in the endless belt 1080'. Sprocket #2 is a sprocket having 8 internal teeth (i.e. teeth extending axially on both sides of the sprocket) in engagement with mating lugs 1090' adjacent to windows in the endless belt 1080'. Sprocket #3 is a sprocket having no teeth in contact with the endless belt 1080'. Sprocket #4 is the drive sprocket 80 in engagement with the endless belt 220.

As shown in the graph displayed in FIG. 15, when the snowmobile 10 is driving at about 25 miles per hour (40 km per hour) the sprocket 80 in engagement with the endless track 30 has a vibration level reduced by 92% compared to the sprocket #1, 86% compared to the sprocket #2, and 88% compared to the sprocket #3. By increasing the number of sprocket teeth (doubling with respect to the sprockets #1 and #2 of the prior art) the torque transmitted from the drive sprocket to the belt is distributed among more contact points than in the past, the impacts thus get reduced and the vibration level decreased. Better traction is ensured which in turn reduces the number of drive sprockets needed on the drive axle 70.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A sprocket wheel and drive track assembly of a tracked vehicle, the assembly comprising:
   at least one drive sprocket, the at least one drive sprocket having a sprocket wheel and a plurality of internal teeth extending laterally therefrom, the plurality of internal teeth being distributed in a circumferential direction on a periphery of at least one side of the at least one drive sprocket, the plurality of internal teeth being disposed at a sprocket pitch from each other;
   a belt in contact with the at least one drive sprocket, the belt having an inner side and an outer side, the belt having a longitudinal direction and a lateral direction; and
   a plurality of internal lugs distributed on the inner side of the belt, at least two of the plurality of internal lugs being engaged by at least two of the plurality of internal teeth of the at least one drive sprocket, the plurality of internal lugs being disposed to form at least one longitudinal row, at least two consecutive internal lugs of the plurality of internal lugs being spaced by a first pitch, the first pitch being longer than an arc length corresponding to the sprocket pitch.

2. The sprocket wheel and drive track assembly of claim 1, wherein the first pitch is a multiple of the arc length corresponding to the sprocket pitch.

3. The sprocket wheel and drive track assembly of claim 2, wherein the first pitch is double of the arc length corresponding to the sprocket pitch.

4. The sprocket wheel and drive track assembly of claim 1, wherein the at least one drive sprocket is adapted to be rotated so as to engage the belt in rotation,
   when the at least one sprocket wheel is rotated to complete one revolution, a number of the plurality of internal teeth of the at least one drive sprocket have transferred torque to an internal lug, the number being fewer than all of the plurality of internal teeth.

5. The sprocket wheel and drive track assembly of claim 1, wherein the at least one sprocket wheel has 16 internal teeth on each side thereof.

6. The sprocket wheel and drive track assembly of claim 1, wherein at least two other consecutive internal lugs of the at least one longitudinal row are disposed at a second pitch from each other,
   the second pitch being shorter than the first pitch, the plurality of internal lugs of the at least one longitudinal row being disposed so as to form a repeating sequence where two second pitches are followed by one first pitch consecutively.

7. The sprocket wheel and drive track assembly of claim 6, wherein the second pitch is one of equal to and smaller than the arc length corresponding to the sprocket pitch.

8. The sprocket wheel and drive track assembly of claim 7, wherein the second pitch is equal to the arc length corresponding to the sprocket pitch.

9. The sprocket wheel and drive track assembly of claim 6, wherein the belt further comprises a plurality of studs extending from the outer side; and
   at least some of the studs of the plurality of studs are positioned in the longitudinal direction between consecutive internal lugs of the plurality of internal lugs that are disposed at the first pitch from each other.

10. The sprocket wheel and drive track assembly of claim 6, wherein the at least one longitudinal row includes a first row and a second row adjacent to each other in the lateral direction;
    the first row and the second row each have the repeating sequence; and
    the repeating sequences of the first and second rows are longitudinally offset from each other.

11. The sprocket wheel and drive track assembly of claim 10, wherein:
    the second pitch is half of the first pitch; and
    the repeating sequence of the first row is offset from the repeating sequence of the second row such that at least one of the two consecutive lugs of the first row disposed at the first pitch from each other is longitudinally aligned with one of the two consecutive lugs of the second row disposed at the second pitch from one another.

12. The sprocket wheel and drive track assembly of claim 1, wherein the at least one drive sprocket includes a first drive sprocket and a second drive sprocket;
    the at least one longitudinal row includes a pair of first rows and a pair of second rows;
    the pair of first rows is adjacent to the pair of the second rows in the lateral direction;
    the first drive sprocket engages internal lugs of the pair of first rows; and
    the second drive sprocket engages internal lugs of the pair of second rows.

13. The sprocket wheel and drive track assembly of claim 1, wherein at any given time,
    at least one sprocket tooth is immediately surrounded by two consecutive inner track lugs; and
    at least one other sprocket tooth of the at least one side of the drive sprocket is immediately surrounded by only one other inner track lug.

14. The sprocket wheel and drive track assembly of claim 1, wherein the at least one side of the at least one drive sprocket includes a first side and a second side;
    at any given time,
       at least one sprocket tooth on the first side of the at least one drive sprocket is immediately surrounded by two consecutive inner track lugs, and
       at least one other sprocket tooth on the second side of the at least one drive sprocket is immediately surrounded by only one other inner track lug; and
       the at least one other sprocket tooth is aligned with the at least one sprocket tooth.

15. The sprocket wheel and drive track assembly of claim 1, further comprising a plurality of external lugs distributed on the outer side of the belt, the plurality of external lugs being disposed so as to form a plurality of lateral rows, the plurality of lateral rows being disposed at an external lug pitch from each other, wherein the first pitch equals the external lug pitch.

16. A sprocket wheel and drive track assembly of a tracked vehicle, the assembly comprising:
    at least one drive sprocket, the at least one drive sprocket having a sprocket wheel and a plurality of internal teeth extending laterally therefrom, the plurality of internal teeth being distributed in a circumferential direction on a periphery of at least one side of the at least one drive sprocket, the plurality of internal teeth being disposed at a sprocket pitch from each other;
    a belt in contact with the at least one drive sprocket, the belt having an inner side and an outer side, the belt having a longitudinal direction and a lateral direction; and
    a plurality of internal lugs distributed on the inner side of the belt, at least two of the plurality of internal lugs being engaged by at least two of the plurality of internal teeth of the at least one drive sprocket, the plurality of internal lugs being disposed to form at least one longitudinal row, at least two consecutive internal lugs of the plurality of internal lugs being disposed at a first pitch from each other,
    a plurality of external lugs distributed on the outer side of the belt, the plurality of external lugs being adapted to be in contact with a ground, the plurality of external lugs being disposed so as to form a plurality of lateral rows, the plurality of lateral rows being disposed at an external lug pitch from one another over the entirety of the outer side of the belt, the external lug pitch being longer than an arc length corresponding to the sprocket pitch.

17. The sprocket wheel and drive track assembly of claim 16, wherein:
    at least two other consecutive internal lugs of the at least one longitudinal row are disposed at a second pitch from each other; the second pitch is shorter than the first pitch;
    the plurality of internal lugs of the at least one longitudinal row is disposed so as to form a repeating sequence where two second pitches are followed by one first pitch consecutively;
    the external lug pitch is longer than the second pitch; and
    the external lug pitch is equal to the first pitch.

18. The sprocket wheel and drive track assembly of claim 16, wherein:
    the first pitch is equal to the external lug pitch; and
    at least one internal lug of the at least two consecutive internal lugs is longitudinally aligned with one lateral row of the plurality of lateral rows of external lugs.

19. The sprocket wheel and drive track assembly of claim 18, wherein at least three other consecutive internal lugs of the at least one longitudinal row are disposed at a second pitch from one another, the at least three other consecutive internal lugs comprising a first internal lug, a second internal lug and a third internal lug,
    wherein:
       the first internal lug is longitudinally aligned with a first lateral row of the plurality of lateral rows of external lugs;
       the third internal lug is longitudinally aligned with a second lateral row of the plurality of lateral rows of external lugs, the first lateral row and the second lateral row being disposed consecutively; and
       the second internal lug is disposed between the first and third internal lug.

20. The sprocket wheel and drive track assembly of claim 16 wherein the external lug pitch is double of the arc length corresponding to the sprocket pitch.

\* \* \* \* \*